(12) United States Patent
Bouche et al.

(10) Patent No.: US 6,997,665 B2
(45) Date of Patent: Feb. 14, 2006

(54) STORAGE LIFT

(75) Inventors: Norbert Bouche, Landau (DE); Hubert Doser, Speyer (DE); Rolf Süss, Stutensee (DE)

(73) Assignee: Bellheimer Metallwerke GmbH, Bellheim/Pfalz (DE)

( * ) Notice: Subject to any disclaimer, the term of this patent is extended or adjusted under 35 U.S.C. 154(b) by 255 days.

(21) Appl. No.: 10/467,948

(22) PCT Filed: Mar. 20, 2002

(86) PCT No.: PCT/DE02/01072

§ 371 (c)(1),
(2), (4) Date: Aug. 14, 2003

(87) PCT Pub. No.: WO02/076859

PCT Pub. Date: Oct. 3, 2002

(65) Prior Publication Data

US 2004/0096302 A1 May 20, 2004

(30) Foreign Application Priority Data

Mar. 23, 2001 (DE) .............................. 101 15 754

(51) Int. Cl.
*B65G 1/04* (2006.01)

(52) U.S. Cl. ....................... 414/280; 414/282
(58) Field of Classification Search ................ 414/280, 414/282, 286, 661
See application file for complete search history.

(56) References Cited

U.S. PATENT DOCUMENTS

| 4,007,846 | A | * | 2/1977 | Pipes | 414/807 |
|---|---|---|---|---|---|
| 4,352,622 | A | * | 10/1982 | Wieschel | 414/277 |
| 4,358,239 | A | | 11/1982 | Dechantsreiter | |
| 4,361,411 | A | * | 11/1982 | Di Liddo | 414/277 |
| 4,750,633 | A | | 6/1988 | Schaefer | |
| 4,756,657 | A | * | 7/1988 | Kinney | 414/281 |
| 4,856,956 | A | * | 8/1989 | Zur | 414/280 |
| 5,199,840 | A | | 4/1993 | Castaldi et al. | |
| 5,213,463 | A | * | 5/1993 | Rothlisberger et al. | 414/280 |
| 5,328,316 | A | * | 7/1994 | Hoffmann | 414/280 |
| 5,551,823 | A | * | 9/1996 | Maruyama | 414/280 |
| 5,810,540 | A | * | 9/1998 | Castaldi | 414/280 |
| 6,619,902 | B1 | * | 9/2003 | Castaldi et al. | 414/280 |

FOREIGN PATENT DOCUMENTS

| DE | 4233688 | | 4/1994 |
| EP | 247524 | * | 12/1987 |
| EP | 0253775 | | 1/1988 |

* cited by examiner

*Primary Examiner*—James W. Keenan
(74) *Attorney, Agent, or Firm*—Mark P. Stone

(57) ABSTRACT

A storage lift has at least one chain drive (14, 15) used for loading and unloading storage goods carriers (4). Each chain drive has two chains (16, 17) that are laterally and vertically offset from each other and are interconnected by coupling members (22, 23). The chains propel drivers (27) fixed to extension arms (24, 25) of the coupling members (22, 23) and are used to transfer the storage goods carriers (4) to a vertical conveyor (1) and to hold them in a position in which the vertical conveyor is movable upwardly and downwardly. The chains (16, 17) of the chain drive or drives (14, 15) are located between the front edges of the storage goods carriers (4), which lie opposite one another in storage columns (2, 3), to enable the vertical conveyor (1) to have a relatively narrow construction.

20 Claims, 10 Drawing Sheets

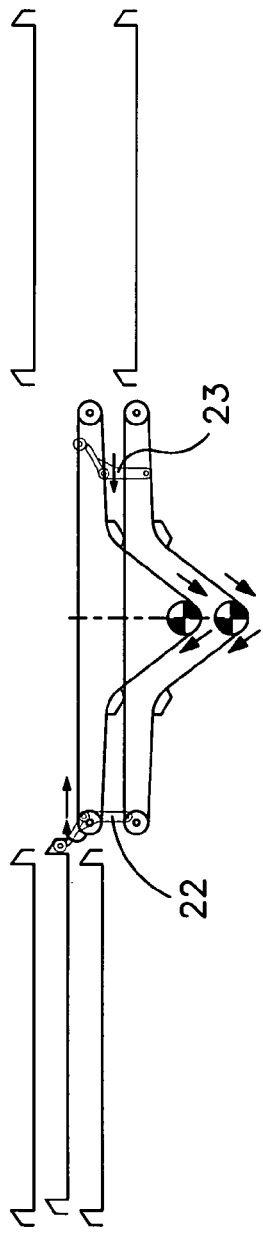
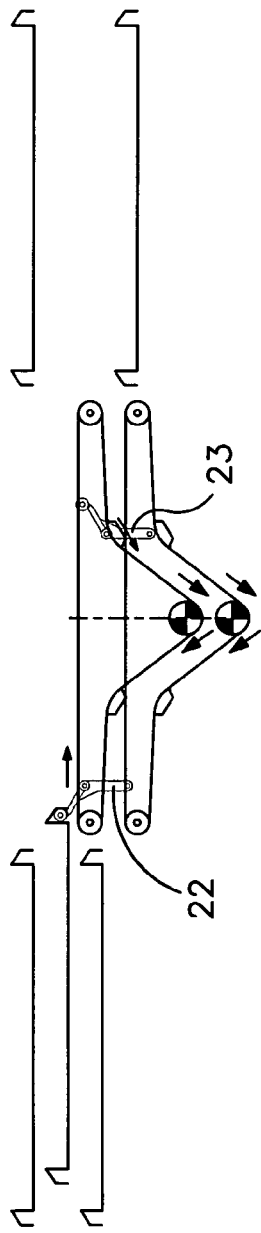
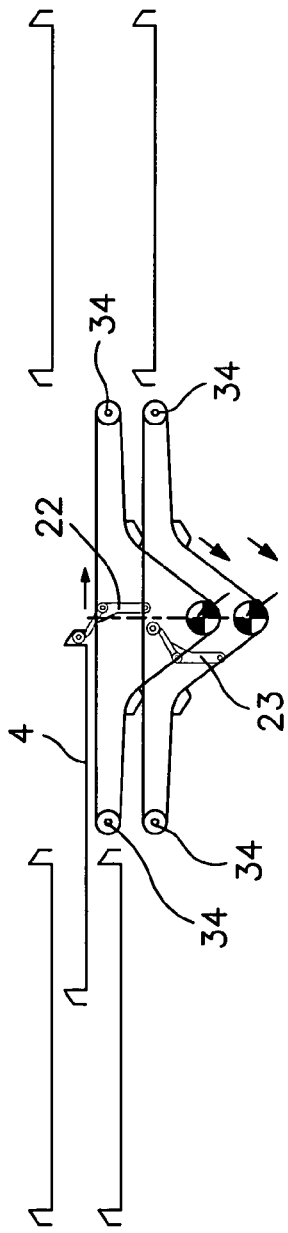

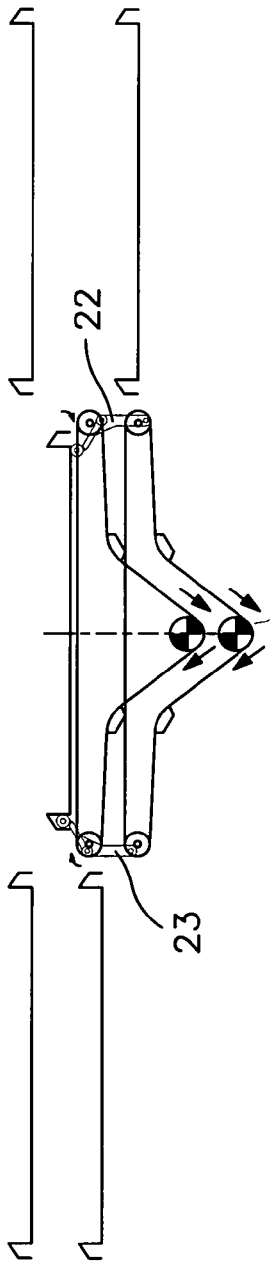
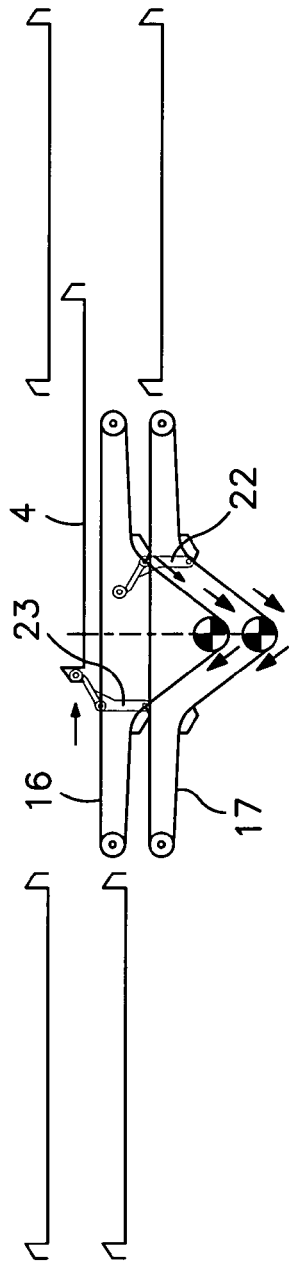
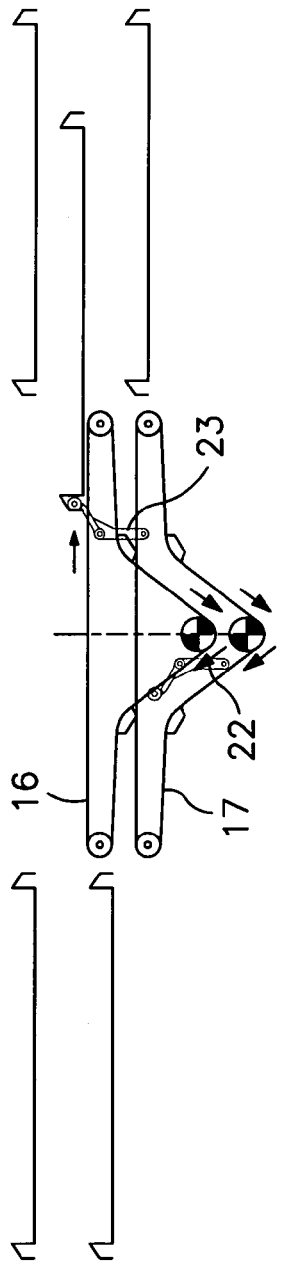
FIG. 17
FIG. 18
FIG. 19

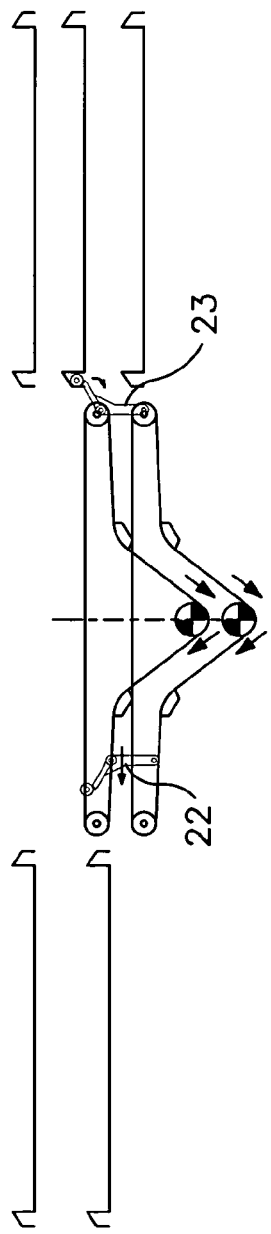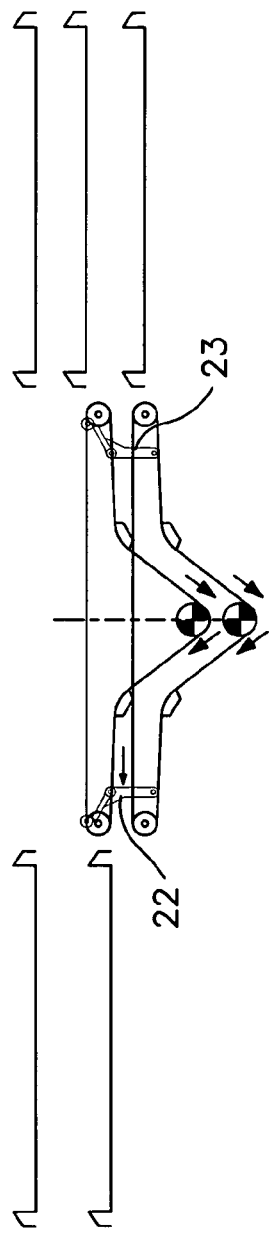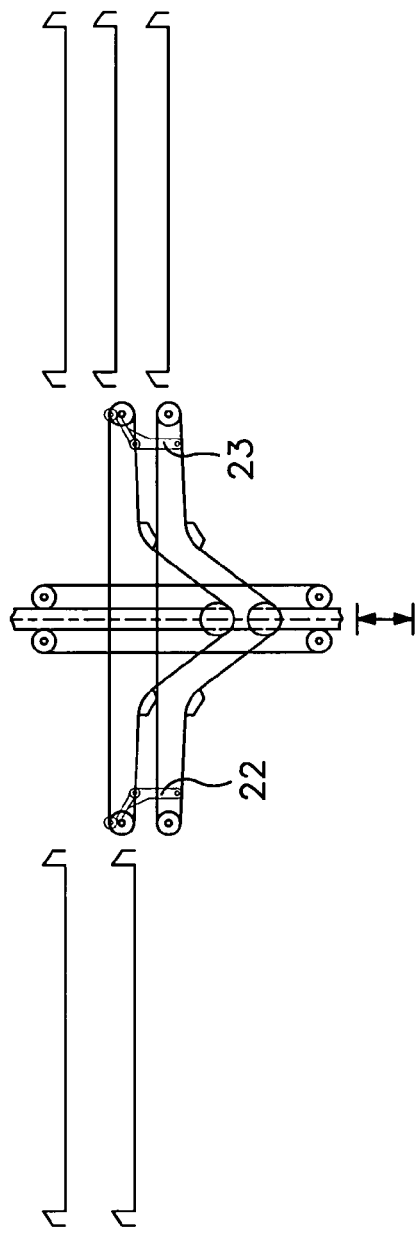

STORAGE LIFT

The invention relates to a storage lift having mutually opposite rack columns which have a multiplicity of pairs of supporting profiles which are arranged one above the other and are intended for mutually opposite sides of storage-goods carriers, which can be stored and retrieved and are provided with carry-along pockets at their mutually opposite ends, and having a vertical conveyor which can be moved up and down between the rack columns and has at least one chain drive which forms a top strand and a bottom strand and has two drivers, of which in each case one serves for introducing a horizontal movement into one of the storage-goods carriers in each case, in order to transfer the latter from the vertical conveyor onto a pair of supporting profiles or from a pair of supporting profiles onto the vertical conveyor, and which, together, retain in a central position, during the vertical movement of the vertical conveyor, the storage-goods carrier transferred onto the vertical conveyor.

Storage lifts of the abovementioned type are known from DE 42 33 688 A1. In order for it to be possible, in the case of the latter, for the storage-goods carriers to be stored in the compartments formed by the pairs of supporting profiles, and then retrieved therefrom again, use is made of chain drives with drivers which engage in each case in one of two carry-along pockets arranged at the mutually opposite ends of the storage-goods carriers. The chain drive and their drivers here are configured and arranged such that their deflecting wheels overlap the ends of the storage-goods carriers laterally and the drivers project laterally beyond the chains, as is described, for example, in U.S. Pat. No. 5,199,840. The disadvantage of such a solution is that the width of the vertical conveyor necessarily has to be larger than the width of the storage-goods carriers.

The object of the invention is to design a storage lift of the type described in the introduction such that the chain drives which drive the drivers no longer have to overlap the storage-goods carriers laterally, as has been the case hitherto, and that, consequently, a single central chain drive is basically also sufficient for storing and retrieving the storage-goods carriers. This object is achieved according to the invention in that the chain drive has two laterally and vertically offset chains of equal length which form equidistant top strands and bottom strands, in that the top strands, which execute a rectilinear horizontal movement, are shorter than the bottom strands, which pass through a dip to allow collision-free circulation of the drivers, in that the higher-level chain is connected to the top ends, and the lower-level chain is connected to the bottom ends, of two coupling members, which are spaced apart from one another in the direction of circulation and are retained, by the chains, in a constant position in relation to the latter during circulation, and in that the coupling members have extension arms which are angled to the same extent in opposite directions and of which the ends form the drivers.

The storage lift according to the invention provides the advantage that it allows a defined separation between the rack columns and the shaft which is intended for the vertical conveyor and is bounded by said rack columns, and that the width of the vertical conveyor need not be larger than the width of the storage-goods carriers.

Further features and details of the invention can be gathered from the subclaims and from the following description of an embodiment of the invention, which is illustrated in the attached drawings, in which:

FIGS. 8–22 show, schematically, the transfer of a storage-goods carrier from the position illustrated in FIG. 8 into the position shown in FIG. 21.

Figure 1:
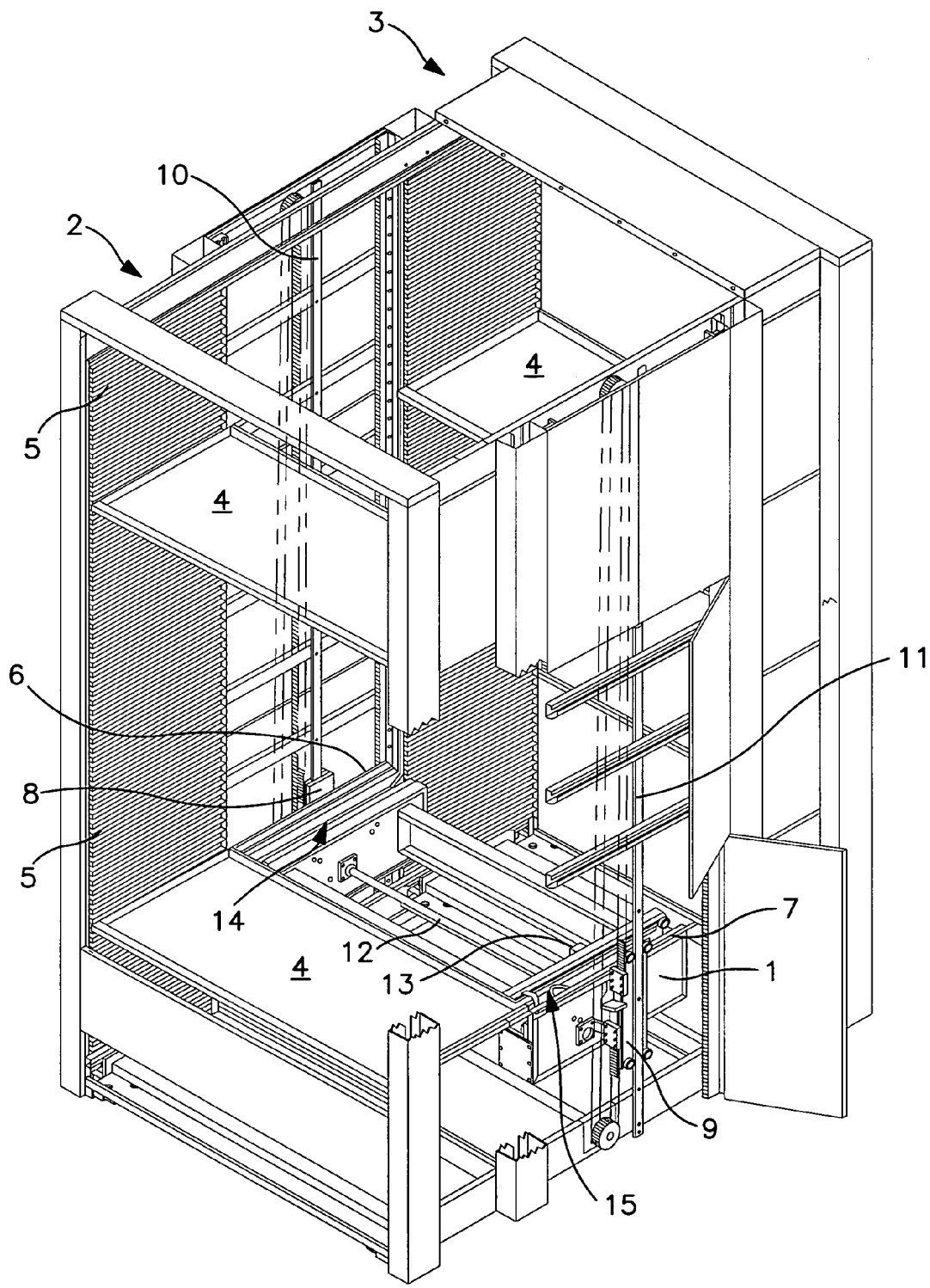
FIG. 1 shows a perspective view of a storage lift, in the case of which parts of the housing cladding and a rack column have been left out in order to aid understanding.
Figure 2:
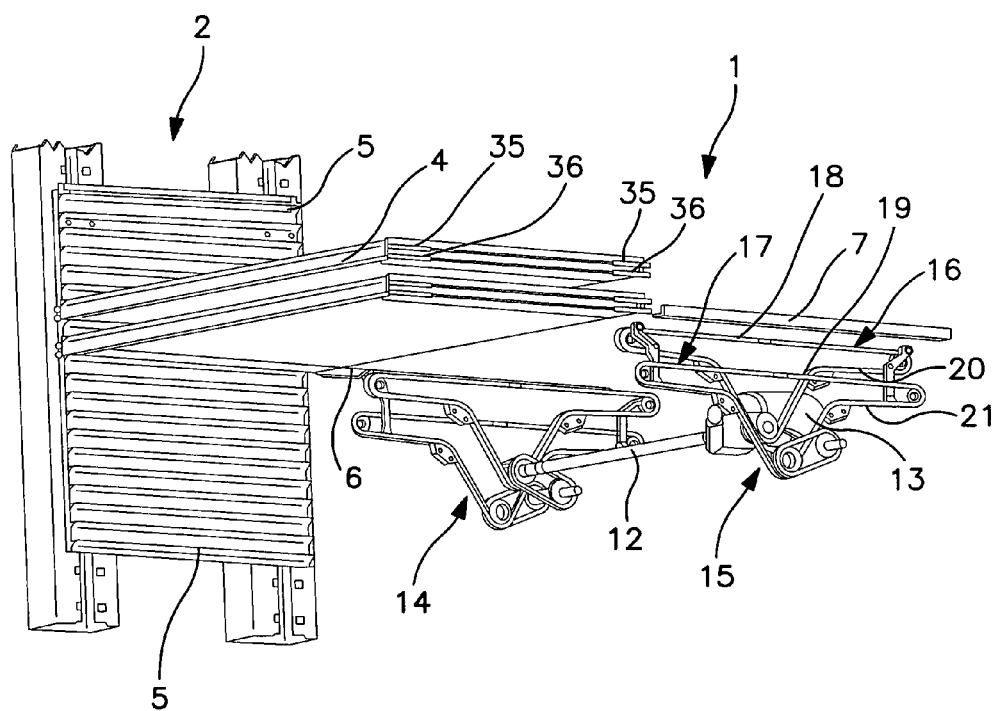
FIG. 2 shows a perspective view of two storage-goods carriers and of the chain drives serving for storing and retrieving the latter.
Figure 3:
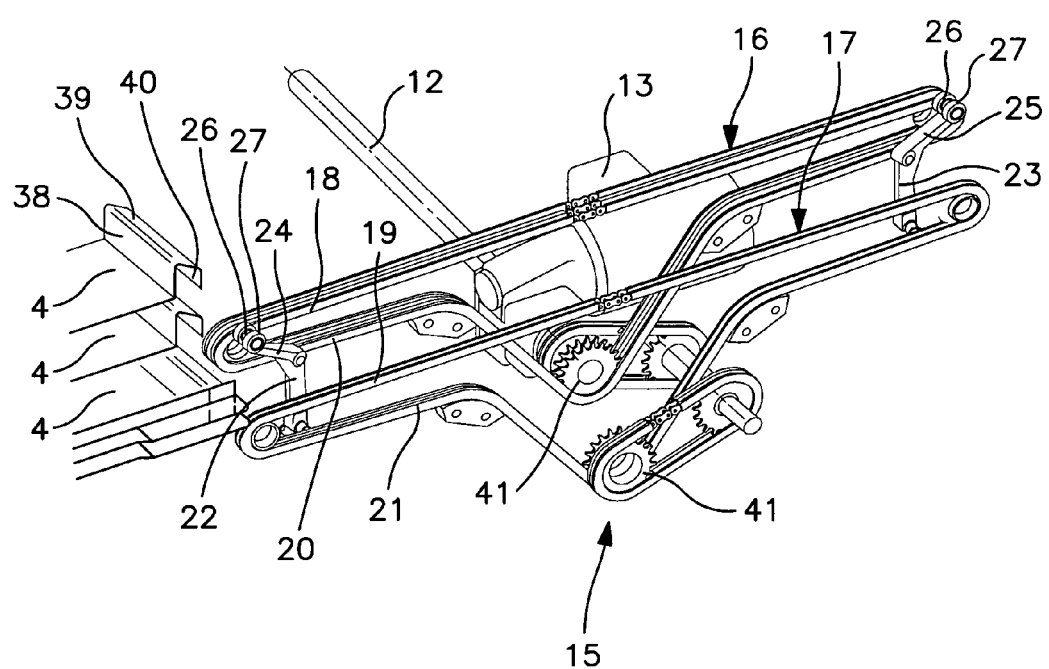
FIG. 3 shows, on an enlarged scale, the front chain drive of the two chain drives illustrated in FIG. 2.

FIG. 1 shows a storage lift with a vertical conveyor 1 which can be moved up and down in a shaft, which is arranged between two rack columns 2 and 3, for the storage and retrieval of storage-goods carriers 4. The rack columns 2 and 3 are provided, on mutually opposite sides, with supporting profiles 5, which form compartments in which the storage-goods carriers 4 can be deposited. The vertical conveyor 1 is equipped, on its mutually opposite sides, with two supporting rails 6 and 7, on which the storage-goods carriers 4 are supported during transportation. The vertical conveyor 1 is guided by two guide carriages 8 and 9 and guide rails 10 and 11 assigned to the latter. In order for it to be possible for the storage-goods carriers 4 to be transferred onto the vertical conveyor 1 and removed therefrom in the region of a charging and removal opening, and in the region of the compartments of the rack columns 2, 3, the vertical conveyor 1 is provided, on its mutually opposite sides, to be precise between the supporting rails 6, 7, with two chain drives 14, 15, which can be driven synchronously by a motor 13, via a shaft 12, and of which the essential parts are illustrated in FIGS. 2–5.

Each of the two chain drives 14 and 15 has two laterally and vertically offset chains 16 and 17 of equal length, of which the chain 16, which is located at a higher level and further inwards in each case, is designed as a double chain. The horizontally running top strands 18, 19 of the chains 16 and 17 are shorter than the bottom strands 20, 21 of the latter, the bottom strands passing through a dip. The two chains 16, 17 of each chain drive 14, 15 are connected to one another in each case by two coupling members 22, 23, which have extension arms 24, 25 which are angled in opposite directions and at the free ends 26 of which are mounted rollers 27, which form drivers for the storage-goods carriers 4.

Figure 4:
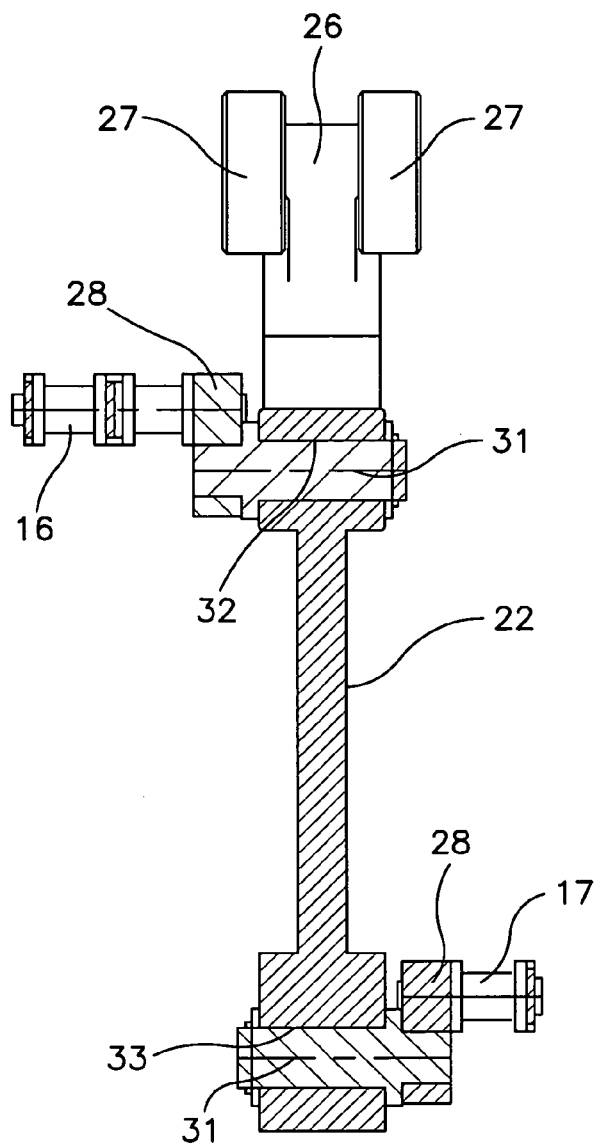
FIG. 4 shows a section through a coupling member which connects the chains of the chain drives to one another.
Figure 5:
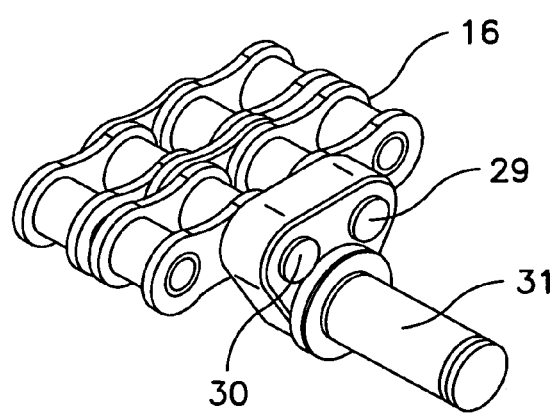
FIG. 5 shows the perspective illustration of a fastening plate arranged between the chains of the chain drives and the coupling members.
Figure 6:
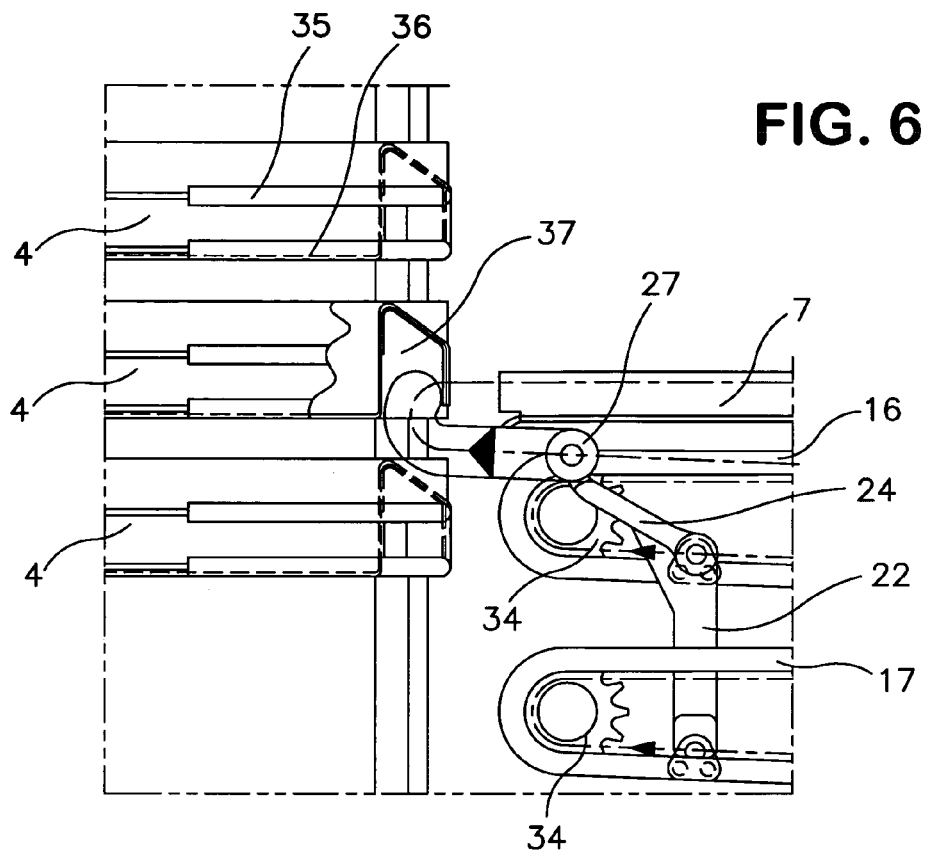
FIG. 6 shows the position of a coupling member prior to the engagement of a driver in a carry-along pocket of a storage-goods carrier.
Figure 7:
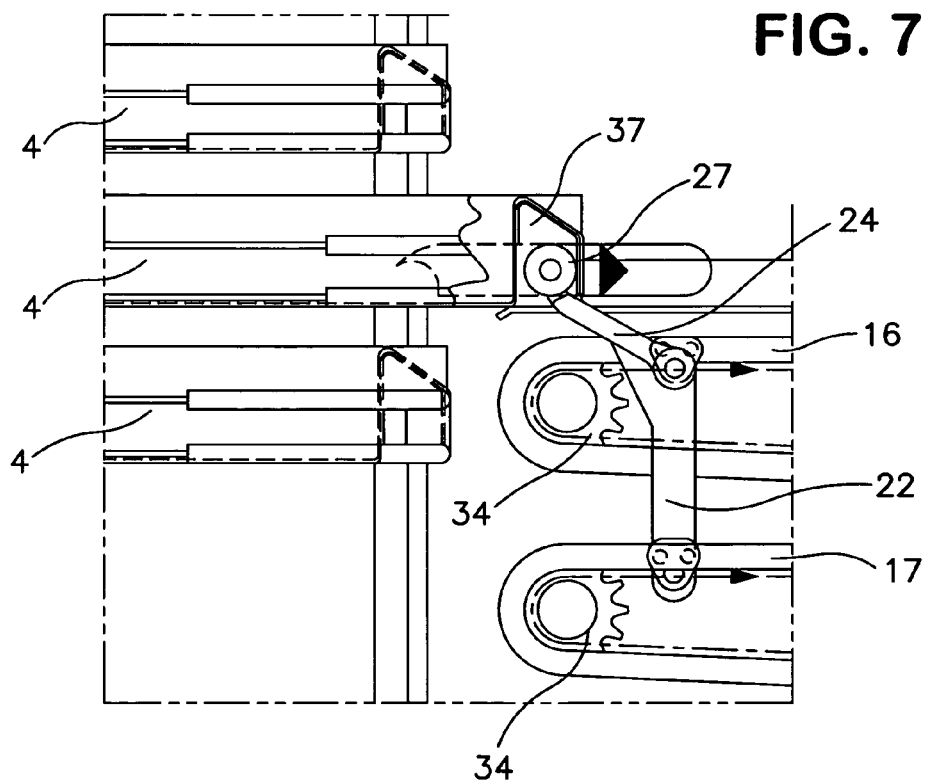
FIG. 7 shows the position of a coupling member following the engagement of a driver in a carry-along pocket of a storage-goods carrier.
Figure 8:
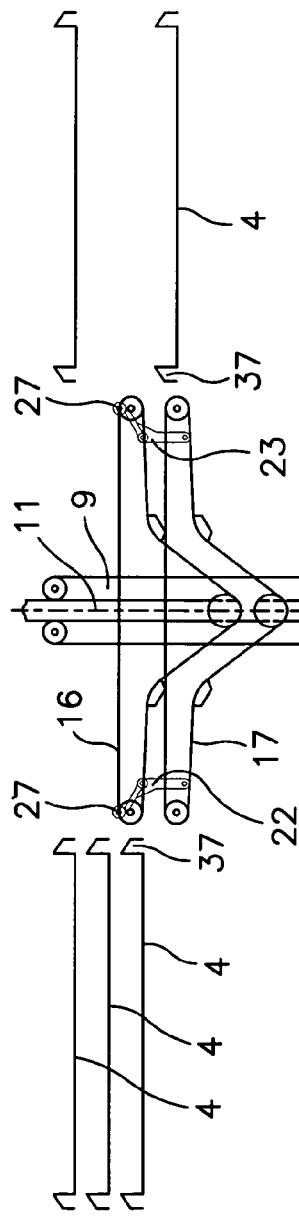

FIGS. 4 and 5 show, with reference to the coupling member 22, the way in which the coupling members are connected to the chain strands 16 and 17. Each chain strand 16, 17 is provided with a connection plate 28, which is retained by two extended chain studs 29, 30 and, in the region of a protrusion, has a bearing journal 31 in each case, the bearing journal being guided in bores 32, 33 of the coupling member 22. By virtue of the coupling members 22, 23 being attached to the chains 16, 17 by means of the connection plates 28, the radius over which the rollers 27 move in the deflecting regions of the chain 16 is reduced in relation to the deflecting radius of the chains 16, 17 in the region of the deflecting wheels 34 of the latter, as can be seen from FIGS. 6 and 7.

In the region of their mutually opposite sides, the storage-goods carriers 4 each have a pair of supporting crosspieces 35, 36 arranged one above the other. Via in each case one of these supporting crosspieces, the storage-goods carriers 4 are supported on the supporting profiles 5 of the rack columns 2, 3 or the supporting rails 6, 7 of the vertical conveyor 1. At their front and their rear ends, the storage-goods carriers 4 have carry-along pockets 37, which are designed in the manner shown in FIG. 3 with reference to the top two storage-goods carriers 4, in the case of which the supporting crosspieces 35, 36 and the side walls of the storage-goods carriers 4 which bear these crosspieces has been cut away to aid understanding. Each carry-along pocket 37 is in the form of a gripping bar, of which the rear wall 38 is connected to a front wall 40, which is shorter than the rear wall 38, via an oblique wall 39 which slopes down in the forward direction. On account of the carry-along pockets 37 being formed in the manner described, the spacing between the supporting profiles 5 of the rack columns 2, 3 which are arranged one above the other in each case may be smaller than in the case of the carry-along pockets 37 having a rectangular cross section.

Figure 9:
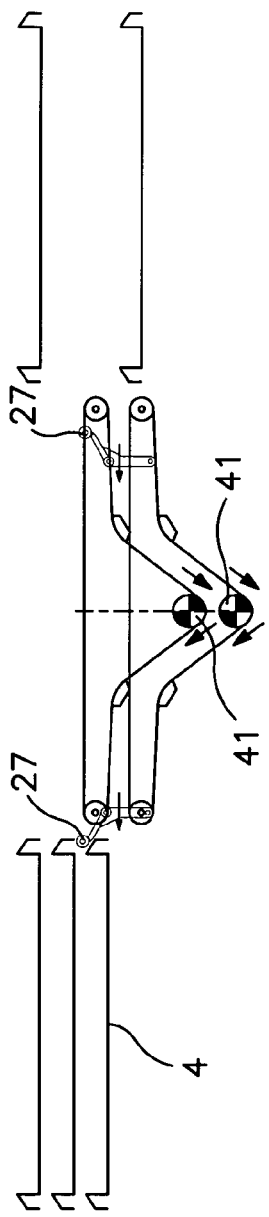
Figure 10:
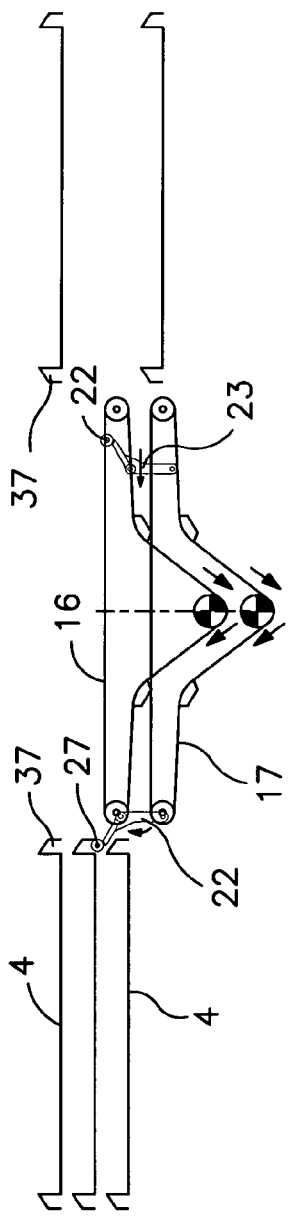
Figure 14:
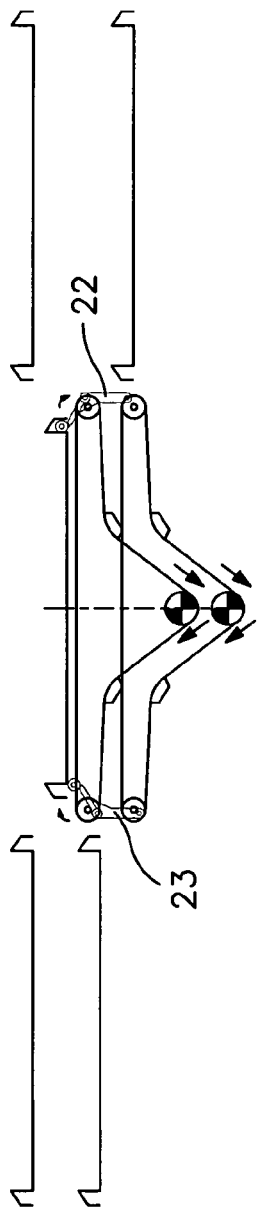
Figure 15:
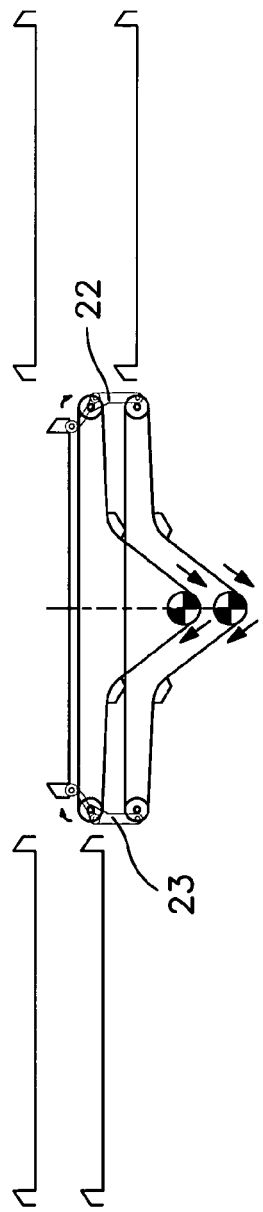
Figure 16:
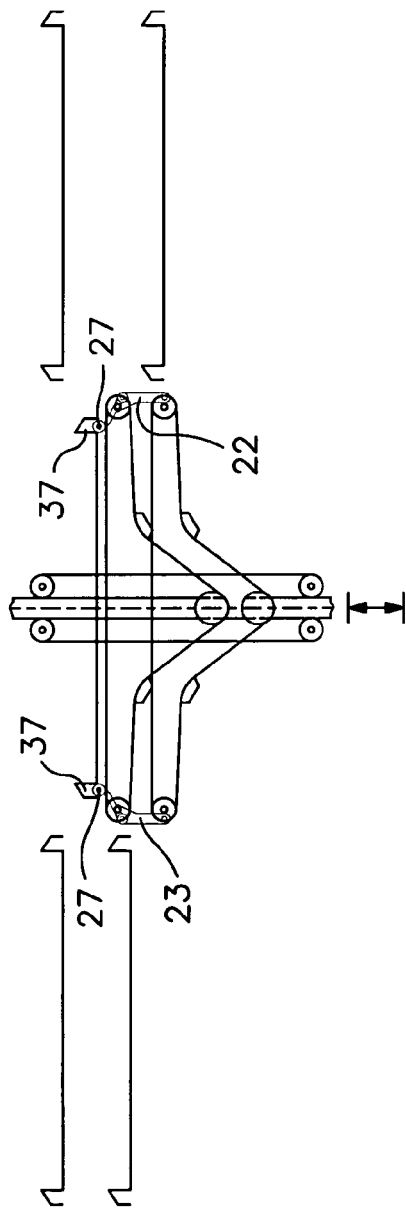

As soon as the motor 13 sets the driving chain wheels 41 for the chains 16, 17 in motion, the procedures illustrated in FIGS. 8 to 22 take place. FIGS. 9 and 10 show how the left-hand driver, formed by rollers 27, moves into a carry-along pocket 37 in order to transfer onto the vertical conveyor 1 the central storage-goods carrier 4 of the three storage-goods carriers 4 depicted. As soon as the storage-goods carrier 4 has reached the position illustrated in FIG. 15, the vertical conveyor 1 can be displaced vertically. It is also possible, however, for the storage-goods carrier 4 just to be displaced from one rack column 2 into the respectively other rack column 3, as is shown, for reasons of simplification, in FIGS. 17 to 20. FIGS. 15 and 21 show the conditions immediately before the motor 13 is switched off, while FIGS. 16 and 22 each illustrate the state of the chain drive in which the vertical conveyor 1 can be moved upward or downward.

What is claimed is:

1. A storage lift having mutually opposite rack columns which have a multiplicity of pairs of supporting profiles which are arranged one above the other and are intended for mutually opposite sides of storage-goods carriers, which can be stored and retrieved and are provided with carry-along pockets at their mutually opposite ends, and having a vertical conveyor which can be moved up and down between the rack columns and has at least one chain drive which forms a top strand and a bottom strand and has two drivers, of which in each case one serves for introducing a horizontal movement into one of the storage-goods carriers, in order to transfer the latter from the vertical conveyor onto a pair of supporting profiles or from a pair of supporting profiles onto the vertical conveyor, and which, together, retain in a central position, during the vertical movement of the vertical conveyor, the storage-goods carrier transferred onto the vertical conveyor, characterized in that the at least one chain drive (14, 15) has two laterally and vertically offset chains (16, 17) of equal length which form equidistant top strands (18, 19) and bottom strands (20, 21), in that the top strands (18, 19), which execute a rectilinear horizontal movement, are shorter than the bottom strands (20, 21) which pass through a dip to allow collision-free circulation of the drivers, in that the higher-level chain (16) of the offset chains is connected to the top ends, and the lower-level chain (17) is connected to the bottom ends, of two coupling members (22, 23), which are spaced apart from one another in the direction of circulation and are retained, by the chains (16, 17), in a constant position in relation to the latter during circulation, and in that the coupling members (22, 23) have extension arms (24, 25) which are angled to the same extent in mutually opposite directions and of which the ends form the drivers (27).

2. The storage lift as claimed in claim 1, characterized in that the chains (16, 17) of the chain drive (14, 15) are arranged beneath a plane which runs through a supporting means (6, 7) for the storage-goods carriers (4) and beyond which the drivers (27) project as soon as the top end of the coupling member (22, 23) belonging to them is located in the region of the top strand (18) of the higher-level chain (16).

3. The storage lift as claimed in claim 2, characterized in that its vertical conveyor (1) is provided with two chain drives (14, 15) which are spaced apart from one another by a distance which is smaller than the width of the storage-goods carriers (4).

4. The storage lift as claimed in claim 2, characterized in that the carry-along pockets (37) for the drivers (27) are formed by gripping bars at the front and rear ends of the storage-goods carriers (4).

5. The storage lift as claimed in claim 2, characterized in that the drivers (27) are designed as rollers which are mounted at the free ends (26) of the extension arms (24, 25) and are guided in a play-free manner in the carry-along pockets (37).

6. The storage lift as claimed in claim 2, characterized in that the carry-along pockets (37) each have a rear wall (38) and a front wall (40) which is shorter than the rear wall (38) and is connected to the latter via an oblique wall (39) which slopes down in the forward direction.

7. The storage lift as claimed in claim 2, characterized in that the chains (16, 17) of each chain drive (14, 15) of the vertical conveyor (1) each pass over two deflecting wheels (34) and a driving chain wheel (41) arranged in the region of the dip.

8. The storage lift as claimed in claim 2, characterized in that the chains (16), which are connected to the top ends of the coupling members (22, 23) of the respective chain drive (14, 15), are designed as double chains.

9. The storage lift as claimed in claim 1, characterized in that its vertical conveyor (1) is provided with two chain drives (14, 15) which are spaced apart from one another by a distance which is smaller than the width of the storage-goods carriers (4).

10. The storage lift as claimed in claim 9, characterized in that the drivers (27) are designed as rollers which are mounted at the free ends (26) of the extension arms (24, 25) and are guided in a play-free manner in the carry-along pockets (37).

11. The storage lift as claimed in claim 9, characterized in that the carry-along pockets (37) each have a rear wall (38) and a front wall (40) which is shorter than the rear wall (38) and is connected to the latter via an oblique wall (39) which slopes down in the forward direction.

12. The storage lift as claimed in claim 9, characterized in that the chains (16, 17) of each chain drive (14, 15) of the vertical conveyor (1) each pass over two deflecting wheels (34) and a driving chain wheel (41) arranged in the region of the dip.

13. The storage lift as claimed in claim 1, characterized in that the carry-along pockets (37) for the drivers (27) are formed by gripping bars at the front and rear ends of the storage-goods carriers (4).

14. The storage lift as claimed in claim 1, characterized in that the drivers (27) are designed as rollers which are mounted at the free ends (26) of the extension arms (24, 25) and are guided in a play-free manner in the carry-along pockets (37).

15. The storage lift as claimed in claim 1, characterized in that the carry-along pockets (37) each have a rear wall (38) and a front wall (40) which is shorter than the rear wall (38) and is connected to the latter via an oblique wall (39) which slopes down in the forward direction.

16. The storage lift as claimed in claim 1, characterized in that the chains (16, 17) of each chain drive (14, 15) of the vertical conveyor (1) each pass over two deflecting wheels (34) and a driving chain wheel (41) arranged in the region of the dip.

17. The storage lift as claimed in claim 1, characterized in that the chains (16), which are connected to the top ends of the coupling members (22, 23) of the respective chain drive (14, 15), are designed as double chains.

18. The storage lift as claimed in claim 1, characterized in that the coupling members (22, 23) are connected to the chains (16, 17) via bearing journals (31).

19. The storage lift as claimed in claim 18, characterized in that the bearing journals (31) are arranged on protrusions of connection plates (28), the protrusions being offset in relation to the respectively opposite chain strand of each chain (16, 17).

20. The storage lift as claimed in claim 2, characterized in that the coupling members (23, 23) are connected to the chains (16, 17) via bearing journals (31).

* * * * *

UNITED STATES PATENT AND TRADEMARK OFFICE
CERTIFICATE OF CORRECTION

PATENT NO. : 6,997,665 B2
DATED : February 14, 2006
INVENTOR(S) : Norbert Bouche et al.

It is certified that error appears in the above-identified patent and that said Letters Patent is hereby corrected as shown below:

Column 4,
Line 2, before "is", insert -- of the offset chains --.

Signed and Sealed this

Eighteenth Day of April, 2006

JON W. DUDAS
*Director of the United States Patent and Trademark Office*